(12) United States Patent
Salter et al.

(10) Patent No.: US 11,479,422 B2
(45) Date of Patent: Oct. 25, 2022

(54) VEHICLE-BASED PACKAGE DELIVERY AND ALIGNMENT SYSTEMS AND METHODS

(71) Applicant: Ford Global Technologies, LLC, Dearborn, MI (US)

(72) Inventors: Stuart C. Salter, White Lake, MI (US); Kendra White, Redford, MI (US); Kristopher Brown, Dearborn, MI (US); Paul Kenneth Dellock, Northville, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 510 days.

(21) Appl. No.: 16/670,977

(22) Filed: Oct. 31, 2019

(65) Prior Publication Data

US 2021/0130114 A1  May 6, 2021

(51) Int. Cl.
| | | |
|---|---|---|
| G08B 21/00 | (2006.01) | |
| B65G 67/24 | (2006.01) | |
| G06Q 10/08 | (2012.01) | |
| E05F 15/73 | (2015.01) | |
| G01B 11/26 | (2006.01) | |
| B65G 1/04 | (2006.01) | |

(52) U.S. Cl.
CPC ............ *B65G 67/24* (2013.01); *B65G 1/04* (2013.01); *E05F 15/73* (2015.01); *G01B 11/26* (2013.01); *G06Q 10/087* (2013.01); *E05F 2015/767* (2015.01); *E05Y 2900/531* (2013.01)

(58) Field of Classification Search
CPC . B65G 67/24; B65G 1/04; E05F 15/73; E05F 2015/767; G01B 11/26; G01B 11/272; G01B 17/00; G06Q 10/087; E05Y 2900/531; B60P 3/00; B60P 1/36
USPC ............................................. 340/435; 701/49
See application file for complete search history.

(56) References Cited

U.S. PATENT DOCUMENTS

| | | | |
|---|---|---|---|
| 2,522,686 A | | 9/1950 | Murphy et al. |
| 4,944,422 A | * | 7/1990 | Aurness ................. A47G 29/20 220/500 |
| 9,256,852 B1 | * | 2/2016 | Myllymaki .......... G06Q 10/083 |
| 9,505,559 B1 | | 11/2016 | Cai |

(Continued)

FOREIGN PATENT DOCUMENTS

| | | |
|---|---|---|
| WO | 2017/085315 A1 | 5/2017 |
| WO | 2017/164914 A1 | 9/2017 |

OTHER PUBLICATIONS

Huetger, Matthias, et al., "Self-Driving Vehicles in Logistics, A DHL perspective on implications and use cases for the logistics industry", DHL Customer Solutions & Innovation (2014) (39 pages).

*Primary Examiner* — Mark S Rushing
(74) *Attorney, Agent, or Firm* — Brandon Hicks; Eversheds Sutherland (US) LLP (57) ABSTRACT

Vehicle-based package delivery and alignment systems and methods are provided herein. An example method includes performing a first alignment of a delivery door of a vehicle with a receiving door of a package locker using location signals that are indicative of a location of the package locker, performing a second alignment of the delivery door with the receiving door based on camera images of an alignment target, and transferring a package from the vehicle to the package locker.

17 Claims, 4 Drawing Sheets

(56) References Cited

U.S. PATENT DOCUMENTS

2016/0235236 A1\* 8/2016 Byers ................. A47G 29/14
2016/0260049 A1   9/2016 High et al.
2018/0330319 A1\* 11/2018 Liang ............... G06Q 10/08355
2019/0291961 A1\* 9/2019 Urban ................. B64C 39/024

\* cited by examiner

VEHICLE-BASED PACKAGE DELIVERY AND ALIGNMENT SYSTEMS AND METHODS

FIELD

The present disclosure relates to vehicle-based package delivery and in some embodiments to systems and methods that align a delivery vehicle with a package locker.

BACKGROUND

Vehicle-based package delivery, including package delivery using autonomous vehicles relies on the delivery of a package directly to a recipient. When the recipient is unavailable to physically receive a package, delays in delivery can occur.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein enable efficient vehicle-based package delivery using an alignment mechanism or process. The alignment mechanism and methods disclosed herein enable package transfer between a vehicle and a package locker. In various embodiments, the package locker is a fixed-location device that can receive and store packages in a secure manner. A vehicle can align with the package locker using any of the alignment mechanisms disclosed herein. Packages can be exchanged between the vehicle and the package locker, or vice-versa. For example, the vehicle can receive a package from the package locker or the package locker can receive a package from the vehicle. The vehicle-based package delivery using a package locker allows for delivery of a package to a recipient, even when the recipient is not physically present to receive the package.

Illustrative Embodiments

Figure 1:
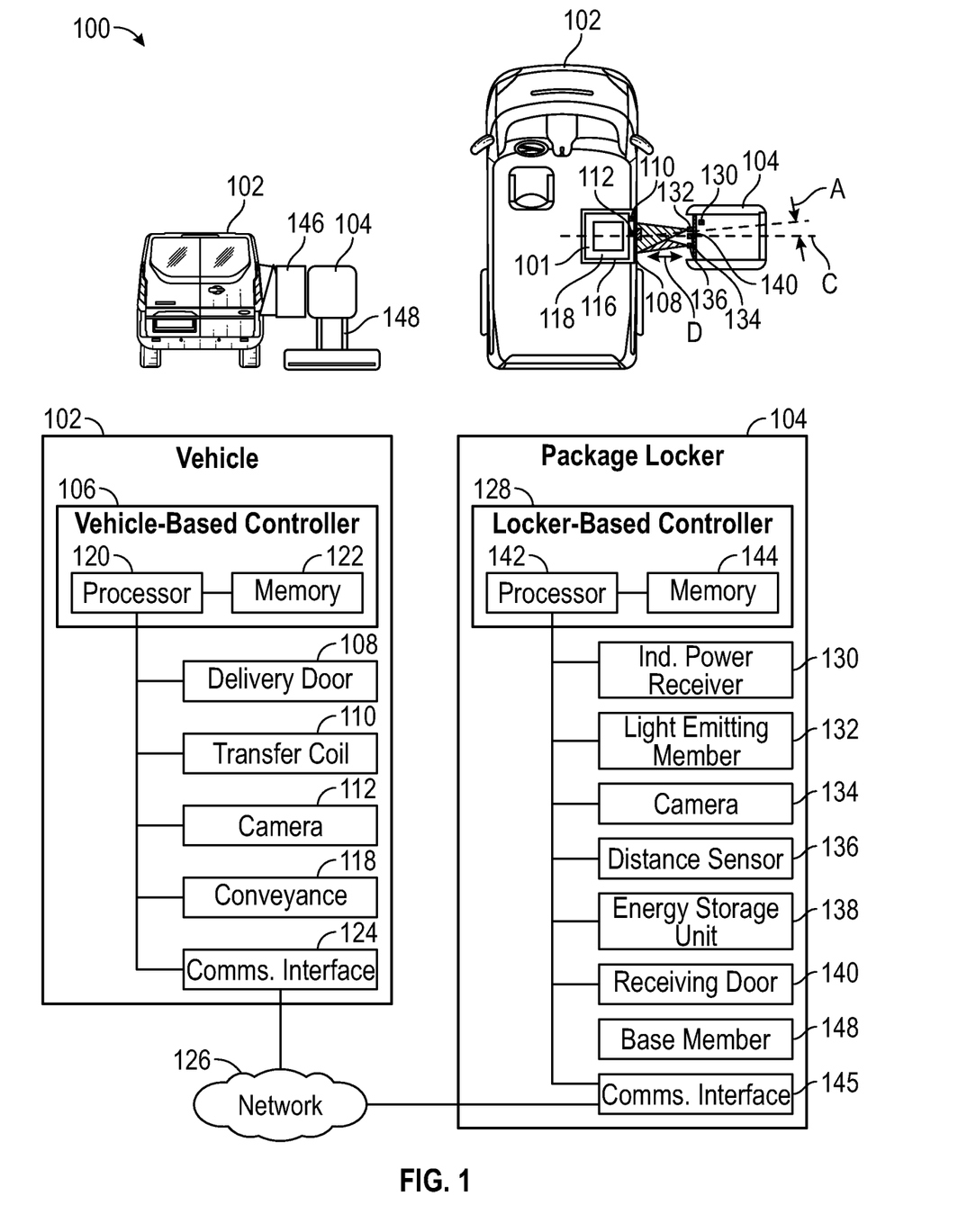
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a vehicle 102 and a package locker 104. A perspective view of the vehicle 102 and the package locker 104, as well as a top-down partial view of the vehicle 102 and the package locker 104 are illustrated.

The vehicle 102 and the package locker 104 can be aligned using one or more alignment mechanisms, which will be disclosed in greater detail infra. An alignment mechanism can be separated such that a portion of the alignment mechanism is associated with the vehicle 102 while another portion of the alignment mechanism is associated with the package locker 104. Broadly, a package 101 can be transferred from the vehicle 102 to the package locker 104, or vice-versa.

According to some embodiments, the vehicle 102 can comprise a vehicle-based controller 106, a delivery door 108, an inductive power transfer coil 110, and a camera 112. The delivery door 108 can include an automated rolling door that can be actuated into opening and closing using the vehicle-based controller 106. The delivery door 108 comprises an alignment target 114 disposed on an outer surface of the delivery door 108 approximately near its centerline C. The alignment target 114 can include any indicia such as a symbol. The alignment target 114 may include a symbol or character painted onto the delivery door 108 using a phosphorescent compound. When light is directed at the alignment target 114, the alignment target 114 can reflect the light, which can be detected by a camera or other sensor associated with the package locker 104, as will be discussed in greater detail infra.

The vehicle 102 can also comprise a delivery enclosure 116 located behind the delivery door 108. A package 101 can be transferred into the delivery enclosure 116 using any desired conveyance 118, such as rollers, a conveyor belt, grasping arm, or push bar—just to name a few. This conveyance 118 can also be used to push the package 101 out of the delivery enclosure 116 for delivery as well. A similar conveyance can be disposed within the delivery enclosure 116. The camera 112 can be disposed inside or above the delivery enclosure 116 but is generally positioned so as to obtain images of the interior of the package locker 104. For example, images from the camera 112 can be used to determine when the package locker 104 is empty and/or clean (e.g., ready to receive the package 101).

The vehicle-based controller 106 can comprise a processor 120 and memory 122. The memory 122 stores instructions that are executed by the processor 120 to perform aspects of the vehicle and package locker alignment as disclosed throughout. When referring to operations executed by the vehicle-based controller 106 it will be understood that this includes the execution of instructions by the processor 120.

The vehicle-based controller 106 can communicate with the package locker 104 using a communications interface 124 over a network 126. The network 126 may include any one or a combination of multiple different types of networks, such as cable networks, the Internet, wireless networks, and other private and/or public networks. In some instances, the network 126 may include cellular, Wi-Fi, or Wi-Fi direct. The network 126 may include a short-range wireless as well, such as Bluetooth, Near Field Communications, and so forth.

The vehicle-based controller 106 can be configured to activate the inductive power transmitter 110 to transfer power to the package locker 104 when the vehicle 102 and the package locker 104 are aligned. To be sure, other methods for transferring power between the vehicle 102 and the package locker 104 can also be utilized. Additional details on power transfer are provided infra.

The package locker 104 can comprise a locker-based controller 128, an inductive power receiver 130, a light emitting member 132, a camera 134, a distance sensor 136, an energy storage unit 138, and a receiving door 140. The locker-based controller 128 can include a processor 142 and memory 144. The memory 144 stores instructions that are executed by the processor 142 to perform aspects of the vehicle and package locker alignment as disclosed throughout. When referring to operations executed by the locker-based controller 128 it will be understood that this includes the execution of instructions by the processor 142. The locker-based controller 128 can communicate with the vehicle-based controller 106 using a communications interface 145 over a network 126. The communications interface 145 can function as a location sensor that identifies a location of the package locker 104 from global positioning sensor (GPS) data, as an example.

The inductive power receiver 130 can receive power from the inductive power transmitter 110 of the vehicle 102 to charge the energy storage unit 138. This allows the vehicle 102 to impart a charge to the package locker 104 on an as-need-basis rather than requiring the package locker 104 to maintain a dedicated power source. Thus, power can be transferred from the vehicle 102 to the package locker 104 when an inductive power receiver 130 of the curbside locker aligns with an inductive power transmitter 110 of the vehicle 102. A charging distance may vary according to the specific inductive power transmitter and receiver used. The package locker 104 can include a dedicated power source.

The energy storage unit 138 can comprise a Lithium Ion battery or another similar energy storage device that can charge rapidly and store charged energy for a long period of time. This allows the energy storage unit 138 to take a rapid inductive power transfer. It will be understood that power can be transferred inductively up to two kilowatts (KW), although other energy transfer amounts can also be used. In various embodiments, the energy storage unit 138 is electrically coupled with the inductive power receiver 130.

With respect to alignment, the locker-based controller 128 can control the light emitting member 132 to emit light as needed. The light emitting member 132 can include any device capable of emitting light that is reflected by the alignment target 114 on the delivery door 108 of the vehicle 102. The type of light emitted by the light emitting member 132 can be based on the alignment target 114 selected. For example, when the alignment target 114 includes a phosphorescent painted symbol, the light emitting member 132 can be configured to emit blue or ultraviolet light that would reflectively react with the phosphorescent paint of the alignment target 114.

The camera 134 is configured to obtain images of the alignment target 114 when the light emitting member 132 is active. The camera images can be processed by the locker-based controller 128 to determine alignment or misalignment between the delivery door 108 of the vehicle 102 and the receiving door 140 of the package locker 104, as will be discussed in greater detail herein. In various embodiments, the light emitted by the light emitting member 132 may only be reflected back to the camera 134 when substantial alignment occurs. In other embodiments, the locker-based controller 128 can be configured to measure a light reflectance angle A of light reflected off of the alignment target 114 to determine misalignment between the delivery door 108 and the receiving door 140. The locker-based controller 128 converts the misalignment measurements into vehicle position adjustments. The vehicle-based controller 106 can use these vehicle position adjustments to fine-tune an alignment between the delivery door 108 and the receiving door 140. The locker-based controller 128 can be further configured to transmit a stop indication to the vehicle-based controller 106 when the misalignment is within a specified threshold range.

In more detail, when the light reflectance angle A (measured relative to the centerline C of the delivery door 108) is within a range of light reflectance angle values, the delivery door 108 and the receiving door 140 are considered to be aligned or at least approximately aligned. For example, if the light reflectance angle A is within +/− three degrees of being reflected back to the camera 134 at a 90 degree angle (i.e., theoretical perfect alignment of the reflected light along the centerline C), the delivery door 108 and the receiving door 140 are considered to be effectively aligned. Thus, the light reflected off of the alignment target 114 need not be perfectly aligned with the centerline C in some instances.

The receiving door 140 can be actuated between an open position and a closed position using the locker-based controller 128. The locker-based controller 128 can keep the receiving door 140 in a closed position until a preliminary or first alignment of the vehicle 102 and the package locker 104 occurs. The locker-based controller 128 can partially or completely open the receiving door 140 after the first alignment. The locker-based controller 128 can cause the receiving door 140 to be in a fully open position when a second alignment occurs, where there is substantial (e.g., threshold level determination mentioned above) alignment between the delivery door 108 of the vehicle 102 and the receiving door 140 of the package locker 104.

The package locker 104 can include selectively adjustable base member 148, such as legs that can be used to alter a height of the package locker 104 to as to accommodate for vehicles of differing heights. The locker-based controller 128 can control the selectively adjustable base member 148 to vertically align the delivery door 108 and the receiving door 140.

The locker-based controller 128 can open or close, or lock or unlock the receiving door 140 based on receiving a locker code from the vehicle-based controller 106. For example, when the vehicle 102 approaches the package locker 104, the vehicle-based controller 106 can transmit a unique code to the locker-based controller 128 to unlock the receiving door 140. When the vehicle 102 departs, a similar process can be used to lock the receiving door 140 after the package is delivered.

The distance sensor 136 can be used to sense a distance D, between the delivery door 108 of the vehicle 102 and the receiving door 140 of the package locker 104. In one non-limiting example, the distance sensor 136 can include an ultrasonic sensor.

In various embodiments, a cover can be associated with each of the cameras, such as the camera 112 and the camera 134. The covers can be actuated to open and close based on signals from their respective controllers. In general, the cameras can be covered by a housing or aperture until used in an alignment process, so as to prevent damage and keep the cameras clean and debris free.

Figure 2:
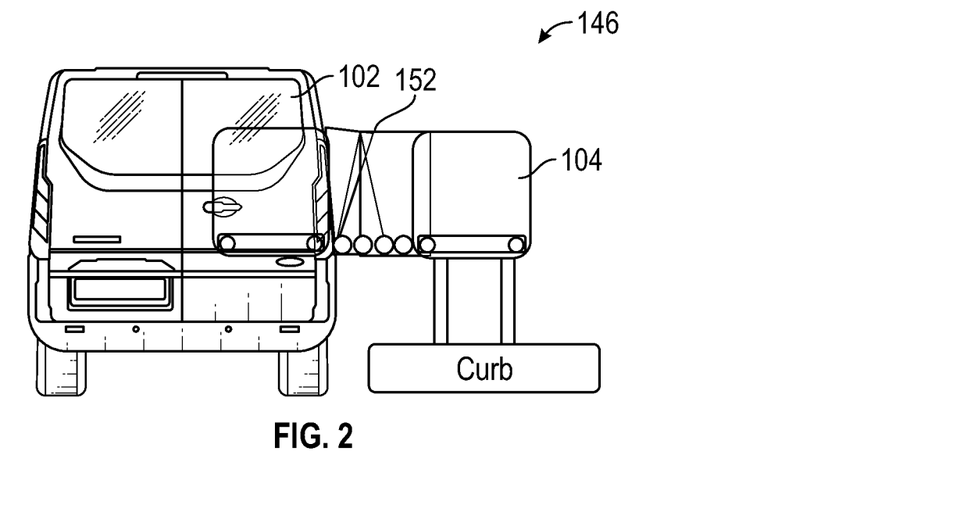
FIG. 2 is a cross section view of an example alignment process between a vehicle and a package locker, with a shroud extending therebetween.
Figure 3:
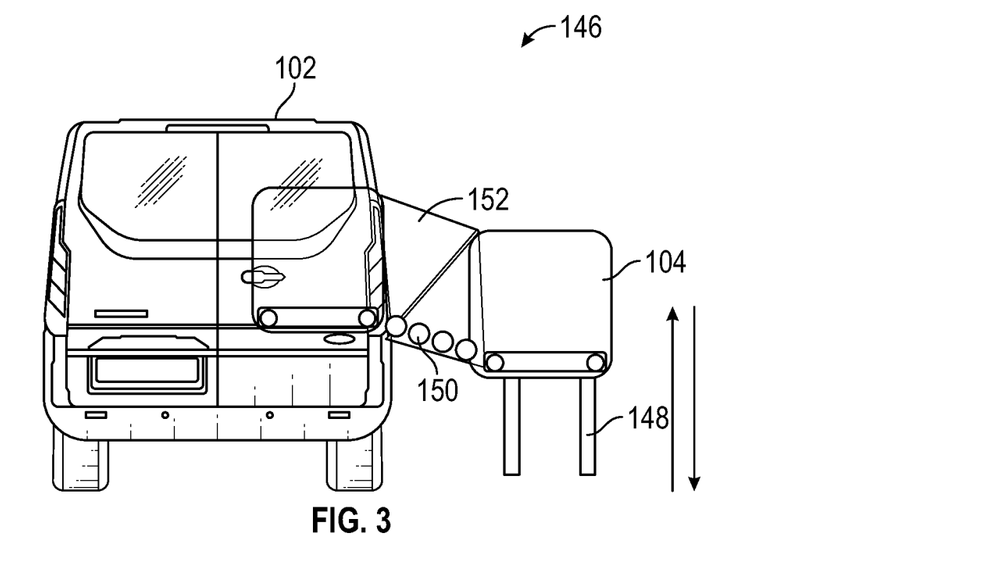
FIG. 3 is a cross section view of an example alignment process between a vehicle and a package locker, with a shroud extending therebetween when the vehicle and the package locker are vertically misaligned.

FIGS. 1, 2, and 3 collectively illustrate a shroud 146 that can be used to bridge a gap between the delivery door 108 of the vehicle 102 and the receiving door 140 of the package locker 104. The shroud 146 can be associated with either the vehicle 102 or the package locker 104. In some instances, the shroud 146 may be extendable to accommodate for various distances between the vehicle 102 and the package locker 104 that may exist. The shroud 146 can include one or more sections 152 and a conveyance 150. The conveyance 150 can include rollers, a conveyor belt, grasping arm, or push bar—just to name a few. The shroud 146 can extend at an upward or downward angle to accommodate differences in height between package lockers. In some embodiments, a width dimension of the shroud 146 and the conveyance 150 are larger than a width of the delivery door 108 of the vehicle 102.

It will be understood that an alignment mechanism used to align the delivery door 108 of the vehicle 102 and the receiving door 140 of the package locker 104 can include any combination of components described infra with respect to the embodiments of FIGS. 1-3. In one example, an alignment mechanism can include the cameras 112 and 134, and the alignment target 114. In another embodiment, an alignment mechanism can include the cameras 112 and 134, and the alignment target 114, and the distance sensor 136. In yet another embodiment, an alignment mechanism can include the cameras 112 and 134, and the alignment target 114, as well as the vehicle-based controller 106 and the locker-based controller 128. In some embodiments, the alignment mechanism can further include the communications interfaces 124 and 145 used to exchange location data.

Figure 4:
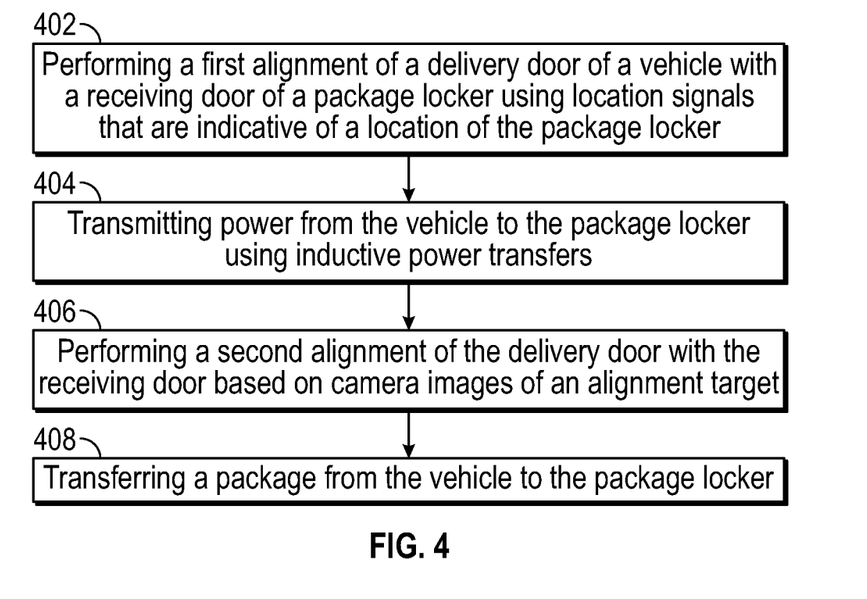
FIG. 4 is a flowchart of an example method of the present disclosure.

FIG. 4 illustrates an example method for aligning a vehicle 102 and a package locker 104. The method steps make reference to elements of FIGS. 1-3. The method can include a step 402 of performing a first alignment of a delivery door of a vehicle with a receiving door of a package locker using location signals that are indicative of a location of the package locker. In more detail, this can include a first alignment between the vehicle 102 and the package locker 104. In some embodiments, the first alignment includes a general alignment based on either or both of Bluetooth signals or GPS signals provided by the locker-based controller 128 over the communications interface 145. The vehicle-based controller 106 can receive the Bluetooth signals or GPS signals and provide signals that can be used to generally align the delivery door 108 of the vehicle 102 and the receiving door 140 of the package locker 104. The signals can be used by a vehicle controller when the vehicle 102 is autonomous. In another example, the signals can be used to identify a location of the package locker 104 for mapping on a navigation system or application used by a driver of the vehicle 102.

The method can include a step 404 of transmitting power from the vehicle 102 to the package locker 104 using inductive power transfers. As noted above, this step is optional as the package locker 104 may have an alternative powering means.

When the vehicle 102 and the package locker 104 are generally aligned in step 402, the method can include a step 406 of performing a second alignment of the delivery door with the receiving door based on camera images of an alignment target. In general, the second alignment is a more specific or fine-tuned alignment compared to the general alignment of step 402. Step 406 can include activation of the camera 134 of the package locker 104 and the light emitting member 132. In some instances, prior to activating the components, the receiving door 140 of the package locker 104 can be partially opened to expose the camera 134. As noted above, the locker-based controller 128 may also open a cover of the camera 134, if one is present.

Figure 5:
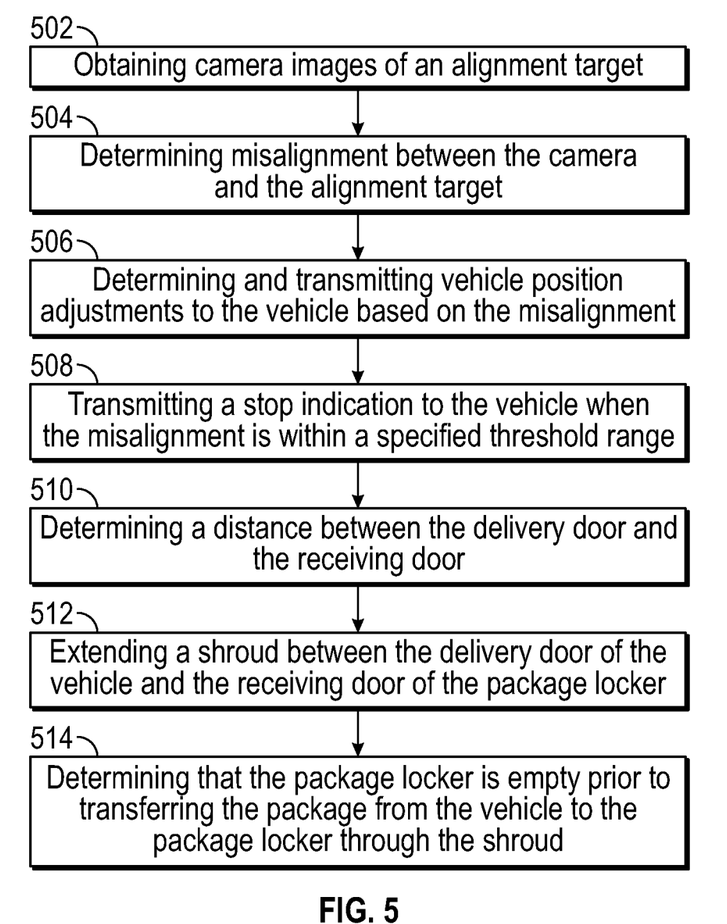
FIG. 5 is a flowchart of another example method of the present disclosure.

According to some embodiments, the locker-based controller 128 can be configured to partially open the receiving door after the first alignment and fully open the receiving door after the second alignment. Partial opening of the receiving door allows for the camera to be exposed, while full opening can occur once suitable alignment is achieved and a package is ready to be transferred to or from the package locker. FIG. 5 illustrates an example method for performing a second alignment of the delivery door with the receiving door based on camera images of an alignment target. Once the second alignment is complete, the method can include a step 408 of transferring a package from the vehicle to the package locker.

The method of FIG. 5 will be discussed with reference to FIG. 1. The method can include a step 502 of obtaining camera images of an alignment target 114. As noted above, the alignment target 114 can include a phosphorescent symbol painted onto the delivery door 108 of the vehicle 102. Light emitted by the light emitting member 132, which is reflected off of the alignment target 114 can be detected in the camera images by the locker-based controller 128.

The method can include a step 504 of determining misalignment between the camera 134 and the alignment target 114. The locker-based controller 128 can calculate a reflectance angle to determine the misalignment. The locker-based controller 128 can determine vehicle position adjustments based on the misalignment. A misalignment can be determined relative to an aligned reflectance angle of zero degrees. That is, when the light reflected off of the alignment target 114 is reflected directly back at the camera 134 of the package locker 104, an aligned reflectance angle of zero degrees exists. When the vehicle 102 is forward or rearward of this aligned position, a reflectance angle is present and can be measured by the locker-based controller 128. The locker-based controller 128 can determine vehicle position adjustments based on the reflectance angle. The vehicle position adjustments indicate whether the vehicle 102 should move forward or reverse to reduce the reflectance angle. Thus, the method can include a step 506 of transmitting the vehicle position adjustments to the vehicle, as well as a step 508 of transmitting a stop indication to the vehicle when the misalignment is within a specified threshold range. Stated otherwise, the reflectance angle measurement and vehicle position adjustments are an iterative process that are conducted until the reflectance angle is reduced to within a specified threshold range. As noted above, this could include any range of relative alignment, such as +/−5 degrees measured relative to an aligned reflectance angle (e.g., a theoretical perfect alignment between the camera 134 and/or the light emitting member 132, and the alignment target 114). This relative alignment will be understood to include a horizontal alignment of the vehicle 102 with the package locker 104. Vertical alignment can be effectuated using either or both of an extendable shroud or the selectively adjustable base member 148 of the package locker 104. In some embodiments, vertical misalignment can be measured using camera images as well.

The method can also include a step 510 of determining a distance between the delivery door and the receiving door. The distance calculation can be used to determine how far a shroud can be extended to bridge between the delivery door 108 of the vehicle 102 and the receiving door 140 of the package locker 104. Also, this distance determination can be used to determine when a distance between the delivery door and the receiving door matches a distance traveled by the shroud when the shroud is extended. This comparative distance measurement can indicate when there may be an item or object blocking the extension of the shroud. For example if the distance between the vehicle and the package locker door is measured to be three feet but the shroud extends to only two feet, it may be indicative that the shroud has malfunctioned or an object is blocking the shroud. For example, the receiving door 140 of the package locker 104 may not have completely opened causing shroud deployment issues. The distance measurement in general can be used to determine if the vehicle 102 is close enough to the package locker 104 for deployment of the shroud.

The locker-based controller 128 can be configured to determine a first distance traveled by the shroud when extended. The locker-based controller 128 can also determine a second distance between the vehicle and the package locker. The locker-based controller 128 can then generate an alert message when the first distance and the second distance are not approximately equal to one another or when an alignment target of the vehicle is not visible to the camera. The alert message could include an audible warning sound output by a speaker associated with either the vehicle 102 or the package locker 104. The alert message could include a message displayed on a human machine interface associated with either the vehicle 102 or the package locker 104.

The method may include a step 512 of extending a shroud between the delivery door 108 of the vehicle 102 and the receiving door 140 of the package locker 104. Next, the method can include a step 514 of determining that the package locker is empty prior to transferring the package from the vehicle to the package locker through the shroud. For example, the camera 112 of the vehicle 102 can be used to inspect an interior of the package locker. In one or more embodiments, the interior of the package locker can be painted white to provide contrast against any objects that may be inside the package locker.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims that refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
   an alignment mechanism for aligning a delivery door of a vehicle with a receiving door of a package locker, the alignment mechanism being associated with either the vehicle or the package locker; and
   a shroud configured to extend and retract between the delivery door and the receiving door, wherein a package can be translated from the vehicle to the package locker,
   wherein the alignment mechanism comprises:
      a light emitting device;
      a camera; and
      a controller comprising a processor and memory, the processor being configured to execute instructions stored in the memory to determine when the delivery door and the receiving door are aligned based on:
         a determination of a location of the vehicle in relation to location signals; and
         camera images obtained from the camera, wherein the camera images include an alignment target which is illuminated by the light emitting device, and
      wherein the alignment target comprises phosphorescent indicia on the delivery door of the vehicle.

2. The system according to claim 1, wherein the package locker further comprises a location sensor configured to generate the location signals that are indicative of a location of the package locker.

3. The system according to claim 1, wherein the controller is further configured to extend the shroud when the delivery door and the receiving door are aligned.

4. The system according to claim 3, further comprising a distance sensor that detects a distance between the vehicle and the package locker.

5. The system according to claim 4, wherein the controller is configured to:
   determine a first distance traveled by the shroud when extended;
   determine a second distance between the vehicle and the package locker;
   generate an alert message when the first distance and the second distance are not approximately equal to one another or when an alignment target of the vehicle is not visible to the camera.

6. The system according to claim 1, wherein the controller is configured to determine that the package locker is empty prior to transferring the package from the vehicle to the package locker through the shroud.

7. The system according to claim 1, wherein the package locker further comprises an inductive power receiver that receives power from an inductive power transmitter of the vehicle, the inductive power receiver and the inductive power transmitter being aligned when the delivery door and the receiving door are aligned.

8. A method, comprising:
   performing a first alignment of a delivery door of a vehicle with a receiving door of a package locker using location signals that are indicative of a location of the package locker;
   performing a second alignment of the delivery door with the receiving door based on camera images of an alignment target;
   transferring a package from the vehicle to the package locker;
   transferring power from the vehicle to the package locker when an inductive power receiver of the package locker is aligned with an inductive power transmitter of the vehicle.

9. The method according to claim 8, further comprising:
   obtaining the camera images;
   determining misalignment between the camera and the alignment target;
   determining vehicle position adjustments based on the misalignment;
   transmitting the vehicle position adjustments to the vehicle: and
   transmitting a stop indication to the vehicle when the misalignment is within a specified threshold range.

10. The method according to claim 8, further comprising extending a shroud between the delivery door of the vehicle and the receiving door of the package locker after the second alignment.

11. The method according to claim 10, further comprising determining that a distance between the delivery door and the receiving door matches a distance traveled by the shroud when the shroud is extended.

12. The method according to claim 10, further comprising determining that the package locker is empty prior to transferring the package.

13. A device, comprising:
a processor; and
a memory for storing executable instructions, the processor executing the instructions to:
instruct a first alignment of a delivery door of a vehicle with a receiving door of a package locker using location signals that are indicative of a location of the package locker; and
instruct a second alignment of the delivery door with the receiving door based on camera images of an alignment target, wherein a package can be transferred from the vehicle to the package locker after the second alignment,
wherein the processor is configured to partially open the receiving door after the first alignment and fully open the receiving door after the second alignment.

14. The device according to claim 13, wherein the processor is configured to:
obtain the camera images;
determine a distance between the delivery door and the receiving door; and
determine a misalignment between the camera and the alignment target.

15. The device according to claim 14, wherein the processor is configured to:
determine vehicle position adjustments based on the misalignment;
transmit the vehicle position adjustments to the vehicle: and
transmit a stop indication to the vehicle when the misalignment is within a specified threshold range.

16. The device according to claim 13, wherein the processor is configured to determine that the package locker is empty prior to transferring the package.

17. A system, comprising:
an alignment mechanism for aligning a delivery door of a vehicle with a receiving door of a package locker, the alignment mechanism being associated with either the vehicle or the package locker; and
a shroud configured to extend and retract between the delivery door and the receiving door, wherein a package can be translated from the vehicle to the package locker,
wherein the package locker further comprises an inductive power receiver that receives power from an inductive power transmitter of the vehicle, the inductive power receiver and the inductive power transmitter being aligned when the delivery door and the receiving door are aligned.

\* \* \* \* \*